United States Patent [19]
van der Pol

[11] Patent Number: 5,279,156
[45] Date of Patent: Jan. 18, 1994

[54] DISTANCE MEASURING DEVICE ESPECIALLY FOR MEASURING THE FILL LEVEL IN INDUSTRIAL TANKS

[75] Inventor: Ronald van der Pol, Venlo, Netherlands

[73] Assignee: Krohne Messtechnik GmbH & Co. KG, Duisburg, Fed. Rep. of Germany

[21] Appl. No.: 854,640
[22] PCT Filed: Nov. 26, 1991
[86] PCT No.: PCT/EP91/02240
  § 371 Date: Jul. 2, 1992
  § 102(e) Date: Jul. 2, 1992
[87] PCT Pub. No.: WO91/12292
  PCT Pub. Date: Oct. 18, 1990

[30] Foreign Application Priority Data
  Jan. 15, 1991 [DE] Fed. Rep. of Germany ....... 4100922

[51] Int. Cl.$^5$ ............................ G01S 13/08; H01P 1/08
[52] U.S. Cl. ................................... 73/290 V; 333/252; 324/643; 324/644
[58] Field of Search ........................... 73/290; 333/252; 324/637, 643

[56] References Cited

U.S. PATENT DOCUMENTS

| | | | |
|---|---|---|---|
| 3,001,160 | 9/1961 | Trousdale | 333/252 |
| 3,289,122 | 11/1966 | Vural | 333/252 |
| 4,556,854 | 12/1985 | Hiramatsu | 333/252 X |
| 4,566,321 | 1/1986 | Zacchio | 73/290 R |
| 4,593,259 | 6/1986 | Fox et al. | 333/252 X |
| 5,038,712 | 8/1991 | Fujiyama | 219/10.55 A |

Primary Examiner—Daniel M. Yasich
Attorney, Agent, or Firm—Townsend and Townsend Khourie and Crew

[57] ABSTRACT

A distance measuring device for measuring the fill level in industrial tanks, which includes electronic transmitting- and receiving elements for short wave electromagnetic waves, such as microwaves, and a cylindrical waveguide which extends through a separating wall and inside of which is a waveguide window separating the two spaces and made of a material, such as quartz glass, which is transmissive with respect to electromagnetic waves. The waveguide and the waveguide window (3) have conically-shaped sections (5) to provide axial support. To protect the waveguide window against destruction due to thermal expansions and pressure fluctuations, the conical section (5) of the waveguide window (3) is in a correspondingly formed conical socket (8). The socket is mounted with play in a cylindrical bore (9) of the waveguide window (3) and is supported by a shoulder (10) of the waveguide in the axial direction. For support in both longitudinal directions, two waveguide windows (3), each with one socket (8), are arranged in a mirror image configuration, and the waveguide is divided into two detachably joined sections so that, when open, the sockets (8) and the waveguide windows (3) can be placed into the cylindrical bores (9) of the sections.

5 Claims, 1 Drawing Sheet

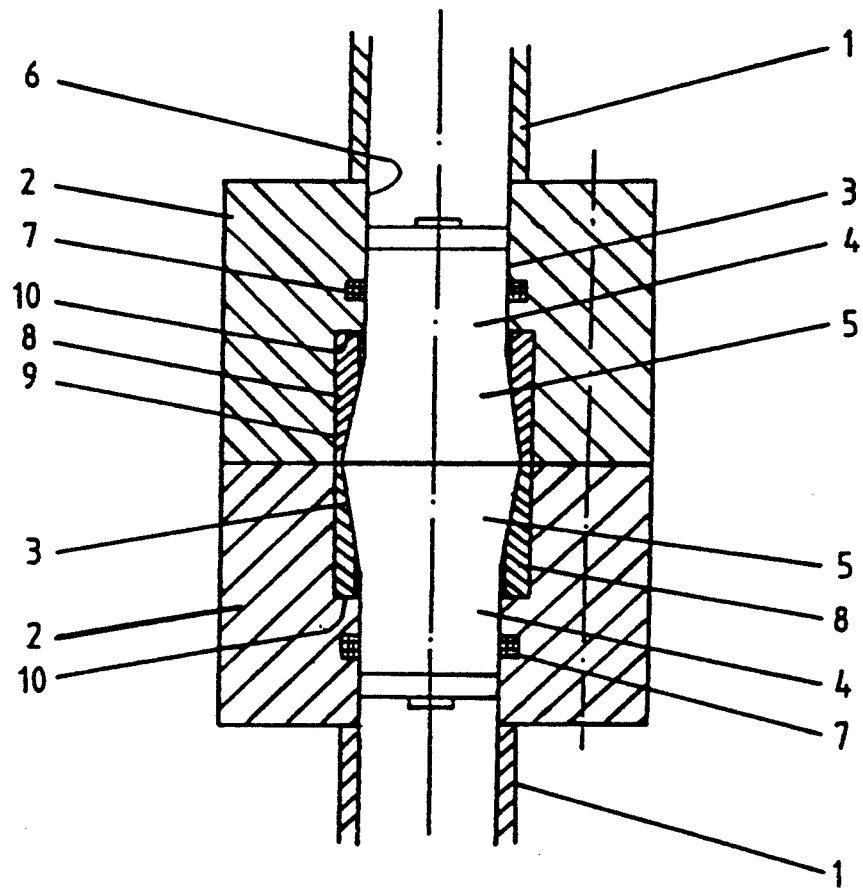

DISTANCE MEASURING DEVICE ESPECIALLY FOR MEASURING THE FILL LEVEL IN INDUSTRIAL TANKS

BACKGROUND OF THE INVENTION

The invention concerns a distance measuring device, in particular for measuring the fill level of industrial tanks. The device is made of electronic transmitting- and receiving elements for short wave electromagnetic waves, such as microwaves, and a cylindrically-shaped waveguide which passes through a separating wall. Inside thereof is a waveguide window which separates the two spaces and is made of a material which is transmissive with respect to electromagnetic waves, such as quartz glass. The waveguide and the waveguide window have conically formed parts to provide axial support for them.

Also known, besides radar instruments for measuring distance, are level measuring devices operating with microwaves, which transmit signals in the microwave range which are reflected by the surface of the medium located in the container and received by the receiver. The distance between the level measuring device and the surface of the medium is determined from the signals with an electronic circuit which may include microprocessors and electronic calculators. To use such microwave level measuring devices with containers, especially industrial tanks, which are subject to high or low operating temperatures and low or high pressures, in particular when they contain explosive and/or corrosive and/or toxic materials, it is necessary to separate the interior of the container from the electronic transmitter- and receiver elements. This is commonly accomplished by arranging inside the waveguide which protrudes through the container ceiling a cylindrically-shaped waveguide window made of quartz glass or the like and which has a low dielectric dissipation factor favorable to the transmittance of microwaves. Thus, the waveguide window constitutes the separator which keeps the electronic elements apart from the content of the tank. When there is a pressure acting from the side of the housing or when there is low pressure on the side of the container, the danger exists that the waveguide window will be pushed out of the waveguide. To prevent this, it is known from U.S. Pat. No. 3,001,160 to provide the waveguide and the waveguide window with conically designed sections. The conical surfaces are in snug contact with each other. In this system the waveguide supports the waveguide window against axial forces, but it has the disadvantage that large temperature fluctuations subject the glass to considerable stress, so that the glass can break or crack. This results not only from the different thermal expansion coefficients of the glass and the waveguide tube, but also the differences in heat dissipation between the two.

SUMMARY OF THE INVENTION

In the face of this, the objective of the invention is to provide a distance measuring device of this type in such a manner that the waveguide window is not destroyed, either under the influence of high pressure and pressure fluctuations or at high temperatures and under temperature fluctuations.

This problem is solved according to the invention in that the conical section of the waveguide window is positioned in an appropriately conically formed socket, which is mounted with play in a cylindrically-shaped bore of the waveguide window, and which is axially supported by a support shoulder of the waveguide.

This embodiment of the invention has the advantage that the waveguide window is securely held in the waveguide against high or low pressure, to prevent the destruction of the waveguide window made of quartz glass or the like. The radial play between the two elements accommodates thermal expansion differences between the waveguide window and the waveguide. When subjected to pressure, the conical section of the waveguide window is pressed against the correspondingly shaped conical surface of the relatively thin-walled socket, which in turn rests against the support shoulder of the waveguide.

The waveguide window with accompanying socket formed according to the invention can be constructed so that there is support in both longitudinal directions. For this purpose two mirror image waveguide windows, each with a corresponding socket, are arranged in the waveguide. The waveguide is divided into two sections which are detachably joined to each other in such a way that in the open state the sockets and the waveguide windows can be placed into the cylinder-shaped bores of the sections to facilitate their assembly. A ring gasket between the cylinder-shaped section of the waveguide window and the waveguide is located in a ring groove inside the waveguide to seal the waveguide against the medium in the region of the waveguide window. The socket is preferably made of a relative thin-walled metal which has a thermal expansion coefficient that is equal to or approaches the one of the waveguide window.

BRIEF DESCRIPTION OF THE DRAWING

The drawing FIGURE is a fragmentary, sectional view through the portion of a distance measuring device constructed according to the present invention which includes a waveguide and the waveguide window separating the interior of a tank from the exterior thereof.

DETAILED DESCRIPTION OF THE PREFERRED EMBODIMENTS

The drawing illustrates a section of a waveguide of a distance measuring device provided with a waveguide window. In this region each of the two waveguide tubes 1 constituting the waveguide has a flange 2, and the flanges are connected to each other with joining elements which are not shown in the drawing. Two waveguide windows 3 are arranged inside the waveguide. Each waveguide window 3 possesses a cylindrically-shaped section 4 and a conical section 5. The cylindrical section 4 extends with a play into a bore 6 of flange 2. The conical section 5, on the other hand, is disposed inside an appropriately constructed, relatively thin-walled socket 8. This socket 8 is mounted with play in a cylindrical bore 9 of the appropriate flange 2. In the axial direction the socket 8 is supported by a shoulder 10 of the waveguide or flange 2. During assembly the sockets 8 and waveguide windows 3 are each placed in the cylindrical bores 9 of flanges 2 while they are separate. In doing this they are positioned in a mirror image with respect to each other. Thereafter the two flanges 2 are conventionally connected to each other.

The cylindrical sections facing away from each other are sealed against the waveguide with a ring gasket 7 by placing the gasket ring 7 in a suitable ring groove in the waveguide. At the free ends of the cylindrical sections λ/4 transformer disks are arranged.

The embodiment illustrated in the drawing can be adapted to various operating conditions. For level measuring devices it is useful to make the waveguide 1 explosion proof.

What is claimed is:

1. A waveguide for use with a distance measuring device employing electronic transmitting and receiving elements, the waveguide comprising:
   a cylindrical waveguide tube adapted to extend through a wall separating two spaces so that ends of the tube are in fluid communication with the respective spaces, the tube including at least one axially facing, interior shoulder intermediate the ends;
   a tubular socket disposed within the waveguide tube having at least one end seated against the shoulder to prevent axial movement of the socket past the shoulder, the socket including a conical portion on its interior which diverges in a direction away from the shoulder; and
   a waveguide window constructed of a material capable of transmitting electromagnetic waves having a cylindrical section and a conical section shaped to conform to the conical portion of the socket, the window being disposed inside the tube and its conical section being seated against the conical portion of the socket;
   whereby the window forms a barrier preventing fluid communication between the spaces through the tube, and the application of pressure against an end of the window presses the window against the conical portion of the socket and the socket against the shoulder of the tube so that relative axial movements of the window under axially acting pressure are prevented.

2. A waveguide according to claim 1 further comprising two waveguide windows arranged in mirror image configuration in the tubular socket, wherein the waveguide tube includes first and second detachably joined sections such that they can be separated to provide access to the socket and the waveguide windows in the tube and to enable the installation of the windows in and their removal from the tube.

3. A waveguide according to claim 1 further comprising a joint gasket located in a ring groove of the waveguide for sealing the cylindrical end of each waveguide window with respect to the waveguide.

4. A waveguide according to claim 1, wherein the waveguide socket is formed from a metal having a thermal expansion coefficient which substantially equals the thermal expansion coefficient of the waveguide window.

5. A waveguide for use with a distance measuring device employing electronic transmitting and receiving elements, the waveguide comprising:
   a cylindrical waveguide tube adapted to extend through a wall separating two spaces so that ends of the tube are in fluid communication with the respective spaces, the tube including at least one axially facing, interior shoulder intermediate the ends;
   a tubular socket disposed with a radial play within the waveguide tube having at least one end seated against the shoulder to prevent axial movement of the socket past the shoulder, the socket including a conical portion on its interior which diverges in a direction away from the shoulder; and
   a waveguide window constructed of a material capable of transmitting electromagnetic waves having a cylindrical section and a conical section shaped to conform to the conical portion of the socket, the window being disposed inside the tube and its conical section being seated against the conical portion of the socket;
   whereby the window forms a barrier preventing fluid communication between the spaces through the tube, and the application of pressure against an end of the window presses the window against the conical portion of the socket and the socket against the shoulder of the tube so that relative axial movements of the window under axially acting pressure are prevented.

* * * * *